United States Patent [19]

Agnew et al.

[11] 4,004,795

[45] Jan. 25, 1977

[54] HOPPER MECHANISM

[75] Inventors: Mark Charles Agnew, Rochester, Minn.; James Jacob Best, Austin, Tex.; Willard Leon Gudgel, Byron, Minn.

[73] Assignee: International Business Machines Corporation, Armonk, N.Y.

[22] Filed: June 12, 1975

[21] Appl. No.: 586,313

Related U.S. Application Data

[63] Continuation of Ser. No. 461,469, April 16, 1974, abandoned.

[52] U.S. Cl. .................. 271/10; 271/34; 271/118; 271/149; 271/233; 271/DIG. 9
[51] Int. Cl.² .................. B65H 3/06; B65H 1/12; B65H 9/06
[58] Field of Search ............ 271/34, 35, 10, 117, 271/118, 4, 6, 7, 149, 150, 126, 225, DIG. 9, 233, 229, 230, 8 A, 3 DA

[56] References Cited

UNITED STATES PATENTS

| | | | |
|---|---|---|---|
| 2,480,192 | 8/1949 | Laxo | 271/233 X |
| 2,812,179 | 11/1957 | Gleason | 271/118 X |
| 2,950,675 | 8/1960 | Copping et al. | 271/149 X |
| 3,035,834 | 5/1962 | Bottrell | 271/149 X |
| 3,077,833 | 2/1963 | Sumida | 271/118 X |
| 3,372,923 | 3/1968 | Watson et al. | 271/119 X |
| 3,532,338 | 10/1970 | Brinson et al. | 271/233 X |
| 3,572,693 | 3/1971 | Larson et al. | 271/233 X |
| 3,768,803 | 10/1973 | Stange | 271/34 |

*Primary Examiner*—Evon C. Blunk
*Assistant Examiner*—Bruce H. Stoner, Jr.
*Attorney, Agent, or Firm*—J. Jancin, Jr.; M. H. Klitzman; K. T. Bleuer

[57] ABSTRACT

A hopper mechanism comprising a hopper front panel and a back shoe horizontally slideable with respect to a hopper base together forming a hopper into which a horizontal deck of document cards may be placed; a belt extending around a pick roll moveable through the front panel for picking an end card in the hopper and driving it downwardly through a throat gap disposed in the hopper base; a relatively large diameter roll supporting the belt and forming a nip with the belt into which the picked document card moves from the throat gap for reversing the direction of movement of the card from vertical to horizontal; a registration arm swingable by the card as it passes out from engagement with the large diameter roll and belt for sensing the position of the card; and a reversely rotating roll coacting with a roller carried by the registration arm for moving the card backwardly, after the card has cleared the registration arm, into contact with a card abutting registration edge of the arm for providing a registered position for the card.

11 Claims, 6 Drawing Figures

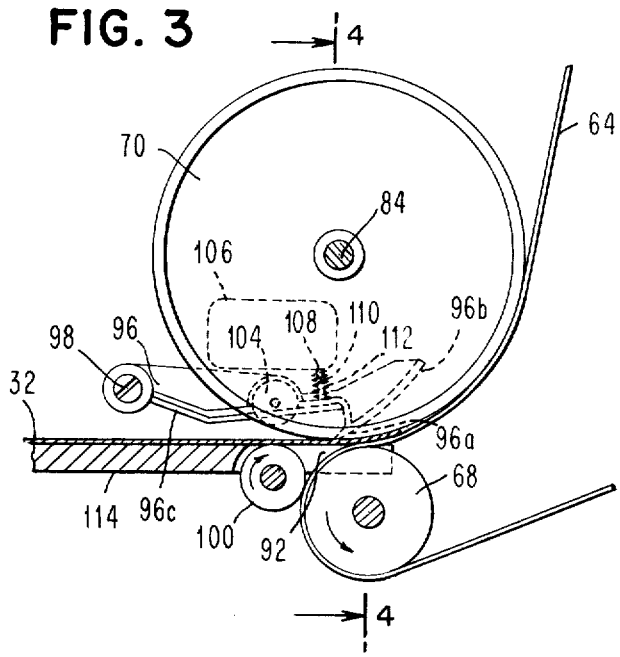
FIG. 3
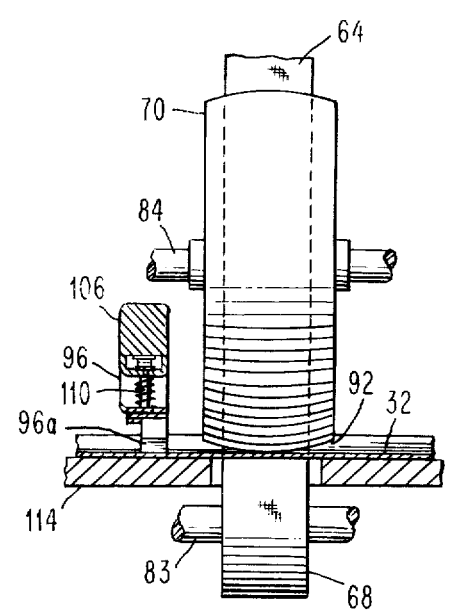
FIG. 4
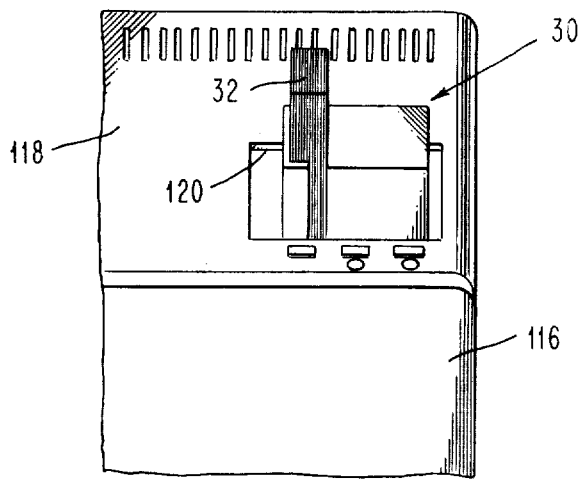
FIG. 5
FIG. 6
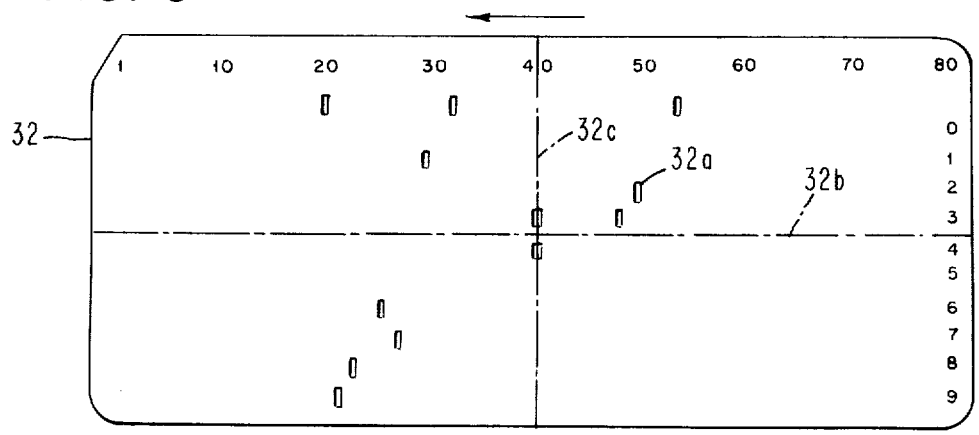

HOPPER MECHANISM

This is a continuation, of application Ser. No. 461,469 filed Apr. 16, 1974, now abandoned.

CROSS REFERENCE TO RELATED APPLICATION

This application is related to the application on "Punching, Reading and Printing Machine For Document Cards," Ser. No. 473,250, filed May 24, 1974, now U.S. Pat. No. 3,964,672, by William K. Aylsworth, Willard L. Gudgel and Richard W. Luoma.

BACKGROUND OF THE INVENTION

The invention relates to document cards and more particularly to hopper mechanisms for holding such cards from which the cards may be fed one by one for subsequent processing.

It has previously been common practice to feed document cards serially or longitudinally from both the top and the bottom of vertical stacks of such cards. Such cards are provided with punched openings through them, and the punching deforms the paper of the cards slightly in the direction in which the punching is done, leaving slight projections or extrusions around the peripheries of the openings. These projections in successive cards fed longitudinally from a stack tend to cause interlocking of the cards and tend to prevent a sliding movement of an end card from the stack; and this interlocking action is particularly pronounced when the bottom card of a vertical stack is fed, since the stack weight forces the deck of cards onto the bottom card that is being fed.

Where, from the design of a document card machine, it is desired tht the bottom card of a card stack be fed, this has also been done by first feeding the card from the bottom of the stack transversely to a cornering station and then feeding the card longitudinally for subsequent operations on the card. Due to the shape of the punched openings, a transverse feeding of a card from the stack does not result in an interlocking of the extrusions around the punched holes of the cards; and the interlocking problem is thus solved but at the cost of increased complexity of the machine.

SUMMARY OF THE INVENTION

It is an object of the present invention to provide an improved hopper mechanism of such a design that punched document cards may be fed serially directly from the hopper of the mechanism without the previous impediments to feeding caused by interlocking of the extrusions around punched holes of the cards.

It is also an object of the invention to provide improved card transporting mechanism in which a card hopper overlies subsequent card feeding portions of the mechanism for providing a compact mechanism overall.

It is also an object of the present invention to provide such improved mechanisms having means for precisely registering a document card fed serially through the mechanism for precise further working on the card, such as punching, etc.

In a preferred form, the improved mechanism of the invention comprises a hopper having a front panel, sides, and a moveable back shoe. This disposition of parts provides the hopper with an opening at its top into which document cards may be put as a deck, with the cards being vertical and with their long dimensions vertical. The back shoe is connected with springs by means of flexible steel ribbons lying across the base of the hopper, and the cards rest on these ribbons which move along with the back shoe for minimizing any frictional effect on the lower edges of the cards. A pick roll having a card transport belt extending across it is moveable through the front panel of the hopper so as to feed an end card of the deck in the hopper downwardly through a throat gap and eventually into the nip between a relatively large diameter roll and the belt. The card is turned in its movement from vertical to horizontal in passing around the roll and onto a horizontal support bed on which the card may be further processed. The hopper and the card deck therein extend over the large diameter roll and over the support bed for shortening the mechanism. A swingable registration arm is actuated by a card as it moves around the large diameter roll, and an electric switch is actuated by the arm so as to indicate the presence of a card at this point. A reversely rotating roll is disposed beneath the arm, and the arm has a roller adapted to make a nip with this reversely rotating roll, with the arrangement being such that this roll and roller reverse the direction of movement of the card as it moves out of the nip between the large diameter roll and the belt so as to move the card backwardly into engagement with a registration edge of the registration arm to precisely position the card for further processing.

BRIEF DESCRIPTION OF THE DRAWINGS

FIG. 3 is a longitudinal sectional view of a lowwer portion of the hopper mechanism with certain of the parts thereof being in changed positions with respect to their positions shown in FIG. 1;

FIG. 4 is a sectional view takes on line 4—4 of FIG. 3;

FIG. 5 is a view of the hopper mechanism as disposed within a machine cover; and FIG. 6 is a face view of a document card usable with the hopper mechanism.

DESCRIPTION OF THE PREFERRED EMBODIMENT

Figure 1:
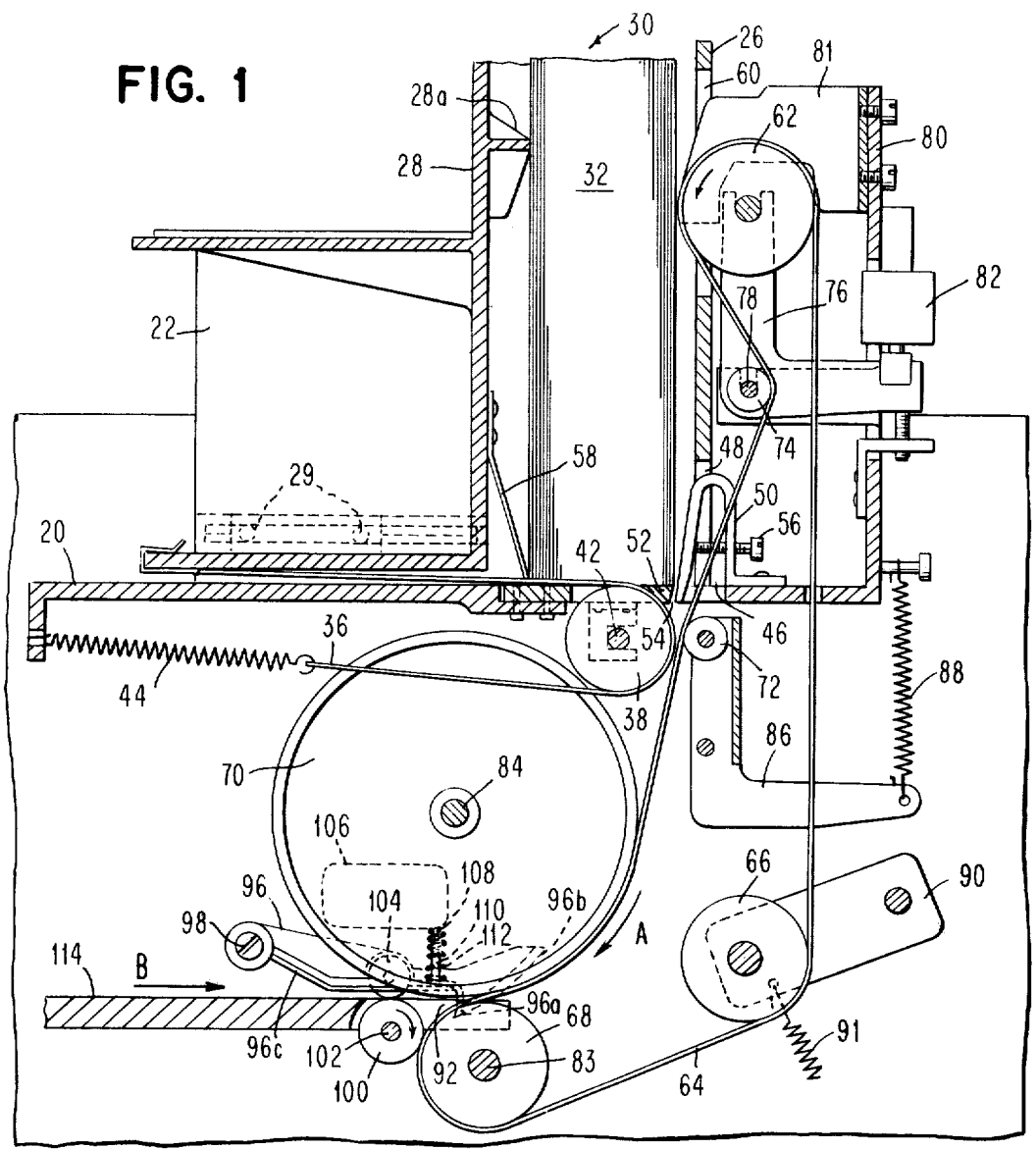
FIG. 1 is a longitudinal sectional view of hopper mechanism embodying the principles of the invention.
Figure 2:
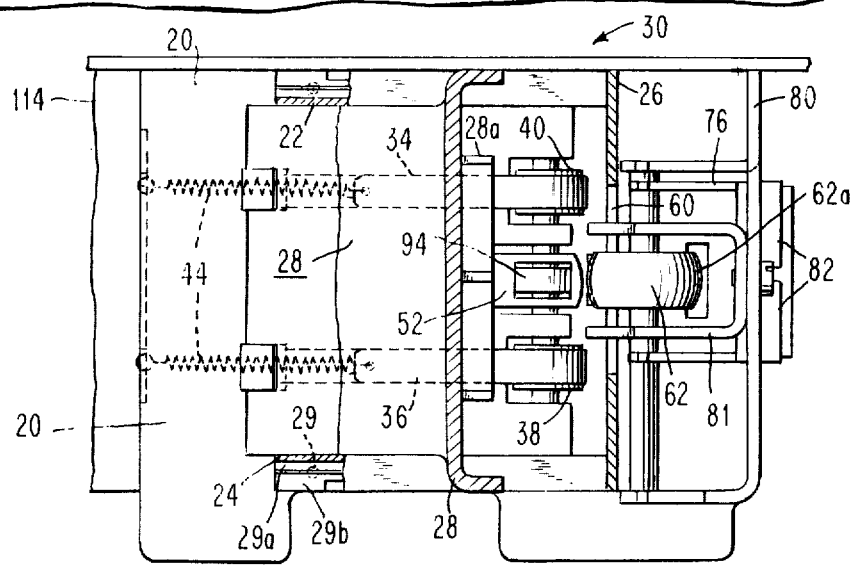
FIG. 2 is a top plan view of the hopper mechanism.

Referring now to FIGS. 1 and 2, in particular, the hopper mechanism may be seen to comprise a horizontal hopper base 20, vertical hopper sides 22 and 24 and a vertical front panel 26. The sides 22 and 24 and the panel 26 are preferably formed integrally and are fixed by any suitable means on the base 20. A back shoe 28 is moveably disposed with respect to the base 20 and is adapted to move between the hopper sides 22 and 24. It will be observed that the back shoe 28 has a forwardly extending protrusion 28a located an appreciable distance above its bottom edge, and a low friction sliding connection is provided between the shoe 28 and the hopper base 20 by means of bearing balls 29 which roll in opposite races 29a and 29b. The sides 22 and 24, the front panel 26 and the back shoe 28 together form a hopper 30, open only at the top, for receiving a deck of document cards 32 in vertically stacked disposition.

A pair of thin, flexible steel ribbons or straps 34 and 36 extend across the upper face of the hopper base 20 and are hooked at their ends to the ends of the back shoe 28. The ribbons 34 and 36 respectively extend around rolls 38 and 40 rotatably disposed on a shaft 42 that is fixed with respect to the base 20. A spring 44 extends between an end of the hopper base 20 and on end of each of the ribbons 34 and 36 so as to put a spring force onto the back shoe 28 tending to move the back shoe toward the panel 26.

The hopper base 20 is provided with an opening 46 in it, and the panel 26 is provided with a corresponding slot 48 in alignment with the opening 46. A U-shaped throat ramp 50 is fixed on the base 20 and extends into the slot 48 and opening 46. A throat knife 52 is fixed to the base 20 and also extends into the opening 46 so as to provide a relatively thin gap 54 between it and the ramp 50. A set screw 56 is screw-threaded into the leg of the ramp 50 fixed to the base 20 and bears against the opposite leg of the ramp 50 so that the gap 54 may be adjusted in width by adusting the screw 56. A throat spring 58 is fixed at its upper end to the hopper back shoe 28 and is disposed opposite the throat ramp 50.

The panel 26 is provided with an opening 60 therein, and a roll 62 is located so that the roll may move through the opening 60. An endless hopper pick and drive belt 64 extends around the roll 62 and, in addition, extends around rolls 66, 68, 70, 72 and 74. The roll 62 is rotatably mounted on bell cranks 76 pivoted on a fixed shaft 78 supported from a standard 80 that is integral with the hopper base 20. A U-shaped part 81 supported by standard 80 extends through the opening 60 for supporting the cards 32 and acting as card bracing means between picking actions by the roll 62. An electromagnet 82 supported by standard 80 is effective on the ends of the bell cranks 76 opposite the roll 62 for moving the roll 62 into the opening 60 when the electromagnet 82 is energized. The rolls 68 and 70 are respectively disposed on shafts 83 and 84 that are laterally fixed with respect to the hopper base 20. The roll 74 is rotatably disposed on the shaft 78, between arms of the bell cranks 76. The roll 72 is rotatably disposed on a lever 86 having a spring 88 acting on it, and the roll 66 is rotatably disposed on a lever 90 having a spring 91 acting on it. The rolls 74 and 72 are relatively small in diameter; the rolls 66 and 68 are of intermediate diameter; and the roll 70 is relatively large in diameter. The belt 64 extends around the roll 70 for an arc of nearly 90 degrees, and the rolls 68 and 70 are so spaced as to provide a gap 92 between the belt 64 and the outer surface of the roll 70. A turning roll 94 is disposed opposite the roll 72 and on the shaft 42, and it will be observed from FIG. 2 that the throat knife 52 is provided with an opening through it for receiving the roll 94. The spring 88 acting on the roll 72 through the lever 86 holds the belt 64 as supported by roll 72 in forceful engagement with roll 94. The spring 91 acting through lever 90 on roll 66 functions by means of roll 66 to hold belt 64 taut. The shaft 83 may be driven from any suitable prime mover (not shown) for thereby driving the belts 64 and causing rotation of rolls 62, 66, 68, 70, 72 and 74.

A registration arm 96 is pivotally mounted on a shaft 98 that is fixed with respect to the hopper base 20. The registration arm 96 has a card registration edge or portion 96a extending generally radially with respect to the center of the shaft 84, a terminal cam portion 96b and a body portion 96c. The terminal portion 96b, when there is no card 32 in the gap 92, is in alignment with the gap 92 and extends generally in the same direction as the peripheral surface of the roll 70 supporting the belt 64 but at a greater angle toward the shaft 84 supporting the roll 70. The card registration portion 96a extends across the gap 92 under these conditions.

A reversely turning roll 100 is rotatably supported on a fixed shaft 102 and is in engagement with the belt 64 as supported by roll 68. The body portion 96c of the registration arm 96 carries a roller 104 rotatably disposed with respect to the arm 96; and, when the registration arm 96 is at the lowermost limit of its movement as seen in FIG. 1, with no card 32 is the gap 92, the roller 104 is in contact with the roll 100.

A registration switch 106 is carried by the hopper base 20, in fixed relationship therewith, and has an actuator 108. The registration arm 96 has a contact post 110 fixed thereto, and post 110 is adapted to contact actuator 108 and put the switch 106 in changed electrical condition when the registration arm 96 swings upwardly. A return spring 112 surrounds the actuator 108 and post 110, yieldably moving registration arm 96 downwardly as seen in FIGS. 1 and 3. A horizontal document card discharge table 114 is disposed downstream with respect to the roll 100. A cover 116 may be provided for the hopper mechanism (see FIG. 5). The cover 116 has a top panel 118 with an opening 120 therethrough through which the upper portions of the hopper mechanism extend.

A card 32 as illustrated in FIG. 6 for use in the hopper mechanism is a standard IBM document card. This card has 80 columns extending transversely of the card and 10 rows, 0 to 9 inclusive, extending longitudinally of the card. Punched oblong openings 32a may be provided in each of the 80 column positions and in each of the 10 rows. Document cards 32 are intended to be stacked into the hopper 30 with the column 1 end of each card down and with the printed side facing the panel 26. The hopper sides 22 and 24 and panel 26 are all vertical, and the cards 32 are thus generally vertical in the hopper 30 and rest on the panel 26. The hopper back shoe 28 is drawn backwardly, away from the panel 26, against the action of the springs 44 to allow the insertion of a deck of the cards 32 in the hopper 30; and then the back shoe 28 is allowed to return to press on the card deck under the action of the springs 44, pressing the card deck against the part 81. The document cards 32 in the hopper 30 rest upon the steel ribbons 34 and 36 and are thus held upwardly spaced from the upper surface of the hopper base 20.

It will be apparent that the back shoe 28 applies force to the deck of cards 32 and the hopper 30 at vertically spaced points along the lengths of the cards 32, at the protrusion 28a and by means of the throat spring 58 at the lower ends of the cards 32. This arrangement assures that normal force sufficient to allow the feed belt 64 to pick the card 32 at the forward end of the deck of cards in the hopper 30, as well as sufficient force to keep the cards 32 in contact with the throat ramp 50 (particularly by spring 58) and allow proper card separation as the cards move one by one through the throat gap 54, is maintained. This structure is very desirable because the deck of cards 32 in hopper 30 is moved slightly away from the card support 81 when the pressure roll 62 is moved through the opening 60 to pick the end card 32 to move it downwardly through the throat gap 54.

In operation, the belt 64 is driven so as to move in the direction A, as by driving the roll 68. When it is desired to feed a card 32 from the hopper 30, the electromagnet 82 is energized, thus swinging the bell cranks 76 counterclockwise as seen in FIG. 1. The belt 64 as supported by roll 62 then contacts the endmost card 32 supported by deck support 81, travelling through the slot 60, thus propelling this card downwardly through the throat gap 54 defined by the throat ramp 50 and the throat knife 52. The gap 54 is adjusted by means of the screw 56 to be just slightly greater than the thickness of one of the cards 32, assuring that only one card 32 may travel at a time between the throat knife 52 and throat ramp 50. As the lower end of the card 32 moves through the gap 54, it is engaged in the nip between the belt 64 as supported by roll 72 and the roll 94, so that the card 32 is drawn farther downwardly to be gripped between the idler roll 70 and the belt 64. As the card travels past the pinch point defined by the rolls 94 and 72, the pick magnet 82 is de-energized; and the pick roll 80 and feed belt 64 move away from the deck of cards 32 in the hopper 30. The deck of cards 32 is then held from the feed belt 64 by the deck support 81; and scrubbing of the feed belt 64 on the second card 32 in hopper 30, as the first card 32 passes downwardly through the throat gap 54, is eliminated. The card travels around the roll 70 and is thus changed in direction, through substantially 90 degrees from vertical to horizontal, and is propelled by the belt 64 and roll 70 onto the horizontal card support 114. The card may be operated upon by any suitable mechanism, such as punching or printing mechanism (not shown) when in position on support 114.

As the card 32 travels around roll 70, its leading end strikes the ramp portion 96b of the registration arm 96 and pivots the arm 96 about its support shaft 98, so that the arm 96 is in substantially its FIG. 3 position. As the arm 96 is swung upwardly, the contact post 110 moves against the switch actuator 108, thus changing the electrical condition of the switch 106, indicating that a card 32 is in the mechanism beneath the roll 70. This upward movement of the registration arm 96 is against the action of the spring 112 which normally holds the arm 96 downwardly to the limit of its movement.

As the card 32 continues its movement, driven by the belt 64 and roll 70 onto the support 114, eventually the trailing end of the card passes beyond the registration portion 96a of the arm 96, allowing the arm 96 to drop under the action of spring 112. The card 32 is at this time held between the roller 104 and roll 100. The roll 100 is driven in a reverse direction (with its upper peripheral surface rotating reversely with respect to the direction of movement of the card 32 as it travels out onto the support 114), and the binding action between the roll 104 and roll 100 under the action of the spring 112 causes the card 32 on the support 114 to reverse its direction of movement to move in direction B. The registration portion 96a of the arm 96 is in the path of movement of the card 32 as so reversed, and the card strikes the registration portion 96a of the arm 96 and is held in this position by the roll 100. The card 32 on the support 114 is thus registered in an exact location on support 114 for a first operation on the card, such as a punching or printing for example.

After the card on the support 114 has been moved off of the support 114 by any suitable means, subsequent to a completion of an operation on the card, succeeding cards 32 from the card deck in hopper 30 may be moved through the throat 54 and onto the support 114 in the same manner, by energizing the electromagnet 82 for each card that is to be so moved.

The punchings 32a through the cards 32, like other punchings in document cards, deforms the paper of the cards slightly in the direction in which the punching is done (on the die side), leaving slight projections or extrusions around the peripheries of the openings. These projections around aligned punch openings in successive cards in a stack tend to interlock and prevent a sliding movement of one card off of the next card in the stack. This interlocking action is overcome in two main ways by the design of the hopper mechanism of the invention: (1) the pressure area of the pick belt 64 on an end card 32 of a stack of cards is restricted in size and is so placed that the greatest pressure is exerted between punched openings 12a, and (2) the weight or gravity forces exerted by a stacked card deck are eliminated.

It will be noted from FIG. 2 that the roll 62 has a rounded or radiused periphery 62a, and the belt 64 similarly has this rounded or radiused shape in its region supported by roll 62 which moves through opening 60 to contact a card 32 in the hopper 30 for feeding the card. Thus, the belt 64, as it travels with the roll 62 for a card feeding operation, contacts the card 32 being fed on a surface area of small size. In addition, the roll 62 has its center in alignment with the longitudinal center line 32b of a card 32 (see FIG. 6) which is centrally located with respect to rows 3 and 4 of punched openings 32a. Incidentally, the roll 62 is also preferably located so that it makes contact with the end card 32 on approximately the transverse centerline 32c of the card, substantially midway between the ends of the card. Thus, the roll 62, being radiused and located to contact a card 32 on the longitudinal centerline 32b, exerts the greatest pressure on the card 32 between punched openings 32a.

The hopper mechanism of the invention eliminates the weight or gravity forces exerted by a stacked card deck by stacking the cards 32 horizontally in the hopper 30 (the individual cards 32 are vertical). Thus, the weight of a vertical stack of document cards is not exerted on a card being fed tending to increase the interlocking forces between this card and the card next to it.

In addition, it will be noted that the cards 32 in the hopper 30 do not directly bear on the hopper base 20, but these cards (except for a few end cards 32 supported by the knife 52) are rather supported by the thin flexible steel ribbons 34 and 36 which move along with the cards 32 and the back shoe 28 as the deck of the cards 32 in the hopper 30 decreases in size. The bands 34 and 36 thus advantageously substantially negate all friction on the lower edges of the cards. In addition, the cards in the hopper 30 have a variable force applied to them in order to advantageously exert a constant force at the hopper throat ramp 50 as the card deck decreases in size. This is accomplished automatically by the changes in length of the extension springs 44 as the cards 32 transverse the base 20 toward the throat ramp 50. The force exerted by the springs 44, of course, decreases as the springs 44 become less in length with movement of the back shoe 28 toward the throat ramp 50, and the change in force applied by the springs 44 is designed to be equal to the force required to be applied to the deck of cards 32 at any point of travel of the hopper back shoe 28 toward the throat ramp 50.

The use of the moveable hopper back shoe 28 also eliminates the need for a card weight which is generally used in connection with card machines, particularly those in which the cards are horizontally disposed in a hopper and are fed from the bottom of the hopper. The throat spring 58 also helps to eliminate the need for a card weight by forcing the deck of cards against the throat ramp 50, thus assuring entry of the cards 32 into the throat gap 54 formed by the ramp 50 and the knife 52.

Since the cards 32 are vertically disposed in the hopper 30, they are easily placed by the machine operator in the hopper; and, in addition, the feed of the cards 32 in the hopper 30 toward the throat ramp 50 is visual to the operator without removing any of the cards from the hopper. The hopper mechanism, like most other card machines, is preferably used with a cover (116). Since the cards 32 are placed in the hopper 30 by moving the cards 32 downwardly into the hopper, the opening 120 for the hopper 30 is in upper panel 118 of the cover. This opening provides improved customer access to the hopper 30 and, in addition, eliminates an opening in the cover aimed directly at the machine operator. This vertical orientation of the hopper 30 and the corresponding opening 120 in the machine cover 116 thus do not expose an operator to excessive noise which is usually directed at an operator with other hopper designs.

As an added advantage of the hopper mechanism as disclosed, it will be noted that the hopper base 20 is disposed above the support 114 and above the idler roll 70 which turns the cards through 90° (from vertical to horizontal) as they move serially through the mechanism, and thus the deck of cards 32 within the hopper 30 overlies to a large extent the card transport including the roll 70 and the ultimate card support 114. This vertical hopper design thus allows a shorter machine length.

Advantageously, the belt 64 not only provides power transmission throughout the hopper mechanism, but it also functions for card picking and card transporting. The registration arm 96 not only serves as a registration device on backward movement of a card 32 particularly by means of registration portion 96a, but the arm 96 also serves as a card lever for detecting the position of the card. The latter is by virtue of the action of the switch 106 under control of the registration arm 96, and both opening and closing of the switch 106 may be used for card feed detection.

Card prefeeding or misfeeding, using the hopper mechanism of the invention, is virtually eliminated due particularly to the throat gap 54 which may be finely adjusted, the location of the first pinch point for a card 32 being fed out of the hopper 30 between the rolls 94 and 72 just below the throat gap 54 and the configuration of the belt 64 slanting downwardly from the roll 74 to the roll 72 nearly in the same direction as a card 32 is ejected from the hopper 30 to this pinch point. In this connection, it will be noted that feed of the cards 32 from the hopper 30 is controlled by the work magnet 82 without the use of any cams or eccentrics which could cause vibration to the mechanism and contribute to card prefeeding or misfeeding.

We claim:

1. Hopper mechanism for document cards including
   means forming a hopper for a deck of the document cards having a slot in one of its surfaces through which a card may be fed from a card deck in the hopper,
   a card engaging driven member engageable with an end card of the deck of cards in said hopper for moving the card out of the hopper through said slot,
   a pair of moveable means forming a nip into which and through which a card from said hopper enters and passes,
   a swinging registration arm positioned adjacent the end of said nip from which a card passing through the nip passes and positioned so that the card passing through the nip actuates said arm,
   a roll positioned adjacent said end of said nip from which a card passes, and
   means driving said roll so that it has a peripheral surface in contact with a card as it moves out of said nip that moves reversely with respect to the direction of movement of the card out of said nip for driving said card backwardly after said card passes through said nip,
   said registration arm having a registration edge in the path of movement of said card being driven backwardly by said roll so as to register said card at a particular place after passing through said nip.

2. Hopper mechanism as set forth in claim 1, said registration arm having a roller rotatably mounted thereon adapted to have a nip with said roll for helping to drive said card backwardly into contact with said registration edge.

3. Hopper mechanism for document cards comprising:
   means forming a hopper for vertically disposed document cards in the form of a horizontal deck including a horizontal hopper base, means for bracing a front card of the deck, and a back shoe effective on the back card of the deck and moveable towards said bracing means;
   said hopper base being provided with a throat gap through it adjacent the front card of the deck through which the front card may pass;
   a pick roll positioned to move into contact with the front card of the deck as braced by said bracing means to move the card through said throat gap;
   a second roll located below said hopper base; and
   means forming a nip with said second roll so that a card driven through said throat gap by said pick roll may move into said nip to be transported around said second roll for changing the direction of movement of said card;
   said means forming a nip with said second roll including a belt extending around both of said rolls, and means for driving said belt and for thereby driving said two rolls;
   the hopper mechanism including a thin flexible ribbon extending across the upper surface of said hopper base for holding the bottom edges of said document cards spaced with respect to the upper surface of said hopper base, one end of said ribbon being attached to said back shoe, and spring means attached to the other end of said ribbon for thereby causing said ribbon to move across said hopper base along with movement of said back shoe toward said card bracing means as the cards are fed through said throat gap out of said hopper.

4. Hopper mechanism for document cards comprising:
   means forming a hopper for vertically disposed document cards in the form of a horizontal deck including a horizontal hopper base, means for bracing a front card of the deck, and a back shoe effective on the back card of the deck and moveable toward said bracing means;

said hopper base being provided with a throat gap through it adjacent the front card of the deck through which the front card may pass;

a pick roll positioned to move into contact with the front card of the deck as braced by said bracing means to move the card through said throat gap;

a second roll located below said hopper base; and means forming a nip with said second roll so that a card driven through said throat gap by said pick roll may move into said nip to be transported around said second roll for changing the direction of movement of said card;

said means forming a nip with said second roll including a belt extending around both of said rolls, and means for driving said belt and for thereby driving said two rolls;

the hopper mechanism including a third roll located adjacent said second roll at a place where the belt and a card in said nip leave the second roll and being driven in such manner by said belt to have a peripheral surface moving reversely to the direction of movement of the card as it leaves said nip;

a registration arm positioned to be contacted by a document card moving through said nip and adapted to drop toward said third roll when said card passes out of said nip towards said registration arm in its continued movement; and a rotatable roller carried by said registration arm adapted to have a nip with said third roll when said arm has dropped for thereby driving the card reversely after it passes beyond the nip of said second roll and belt, said registration arm having a registration edge which is in the path of said card in its reverse movement under the action of said third roll for thereby accurately locating said card in a registered position.

5. Hopper mechanism for document cards comprising:

means forming a hopper for vertically disposed document cards in the form of a stack including a hopper base extending transversely of said document cards and supporting the document cards, means for bracing a front card of the stack, and a back shoe effective on the back card of the stack and moveable toward said bracing means, said hopper base being provided with a throat gap through it adjacent the front card of the stack through which the front card may pass, a pick roll positioned to move into contact with the front card of the stack as braced by said bracing means to move the card through said throat gap, a thin flexible material strip extending across the upper surface of said hopper base for holding the bottom edges of said document cards spaced with respect to the upper surface of said hopper base, one end of said strip being attached to said back shoe, and means for exerting a pull on the other end of said strip for thereby causing said strip to move across said hopper base along with movement of said back shoe toward said card bracing means as the cards are fed through said throat gap out of said hopper.

6. A hopper mechanism as set forth in claim 5 and including a direction reversing roll across which said strip extends and positioned adjacent said throat gap and with its upper periphery substantially in line with the upper surface of said hopper base.

7. Document card transport mechanism including moveable means for engaging with a document card and propelling it forwardly in a certain path, a swinging registration arm positioned in said path and having a document card registration edge in said path and arranged so that a card passing forwardly in said path swings the registration arm to move the registration edge out of the path to allow the card to pass beyond said registration edge, a roll positioned to have a peripheral surface in said path beyond said registration edge, and means for driving said roll so that its said peripheral surface moves reversely with respect to the forward direction of movement of a document card so that the roll drives the document card backwardly after said card passes beyond said registration edge and drives the card into contact with said registration edge so as to register the card in a particular position in said path.

8. Document card transport mechanism as set forth in claim 7, said moveable means engaging with a document card including a rotatable roll for driving the document card forwardly along said path, said registration arm having a ramp portion extending obliquely with respect to said path of card movement so that when a card moves into contact with the ramp portion it swings said arm to move its said registration edge outwardly of said path of document card movement.

9. Document card transport mechanism as set forth in claim 8 and including a roller carried by said registration arm and adapted to have a nip with said reversely rotating roll when the registration arm is in its position in which said registration edge is in said card path for assuring that the reversely rotating roll moves a document card backwardly in said path and against said registration edge.

10. Document card transport mechanism including:

moveable means for engaging with a document card and propelling it forwardly in a certain path, a document card registration member moveable into and out of said path, said registration member including means located at a lower end thereof for moving the registration member out of said path to allow the card moving in the forward direction in said path to pass beyond said registration member, and a contact post for activating a switching means located adjacent said registration member which detects the position of a document card when said registration member is moved upwardly by a document card moving in the forward direction, means coordinated with the movement of the card beyond said registration member when moving in the forward direction in said path for moving said registration member back into said path, moveable means for engaging with the document card and driving it in the reverse direction in said path when the card is positioned in said path forwardly of said registration member, and means for rendering said moveable means for driving the card reversely effected coordinately with the movement of said registration member back into said path so that this moveable means drives the card reversely after the card passes beyond said registration member and drives the card into contact with the registration member so as to register the card in a particular position in said path.

11. Document card transport mechanism including:

moveable means for engaging with a document card and propelling it forwardly in a certain path, a document card registration member moveable into and out of said path, said registration member including means located at a lower end thereof for moving the registration member out of said path to allow the card moving in the forward direction in said path to pass beyond said registration member, means coordinated with the movement of the card beyond said registration member when moving in the forward direction in said path for moving said registration member back into said path, moveable means for engaging with the document card and driving it in the reverse direction in said path when the card is positioned in said path forwardly of said registration member, and a roller rotatably disposed on said registration member for rendering said moveable means for driving the card reversely effective coordinately with the movement of said registration member back into said path, said roller forming a binding action with said moveable means for driving the card in a reverse direction into contact with the registration member so as to register the card in a particular position in said path.

* * * * *